Aug. 28, 1962   J. H. LEMELSON   3,050,824
REFLECTIVE THREAD
Filed Sept. 1, 1959

INVENTOR.
Jerome H. Lemelson
BY

United States Patent Office 3,050,824
Patented Aug. 28, 1962

3,050,824
REFLECTIVE THREAD
Jerome H. Lemelson, 8B Garfield Park Apt.,
Metuchen, N.J.
Filed Sept. 1, 1959, Ser. No. 838,018
5 Claims. (Cl. 28—82)

One of the primary reasons for nighttime automobile accidents involving pedestrians is that the driver of the vehicle cannot see the pedestrian who may be crossing the street or walking in the street in the direction or traffic, until it is too late to avoid striking him. The outer clothing of the average pedestrian is usually made of a dark material which absorbs most of the light rather than reflecting it. As a result, a motor vehicle operator travelling at only moderate speeds will often not be able to see a pedestrian walking or standing in his path of travel in time to stop or turn his vehicle. As a result many injuries and deaths are caused.

Prior to the instant invention, one solution to the problem of nighttime pedestrian safety has been to attach one or more reflectors to the pedestrian's clothing, the reflectors reflecting the light from the headlights of an oncoming vehicle and thereby warning the driver of the presence of the pedestrian long before he would otherwise see him. Another form of safety clothing that has been developed consists of a plastic material that is coated on a woven cloth with a multitude of small glass spheres suspended in said plastic coating, each of the glass beads serving as a reflex reflector and returning light striking the cloth to its source. While such a reflectorized cloth does serve the purpose as a reflecting medium, it has a number of disadvantages. In the first place, it is not suitable for use as wearing apparel due to the stiffness, weight and appearance of the coated sheet. In addition, the small glass spheres are easily dislodged when the garment is cleaned or washed, and as a result, this reflectorized cloth has been limited in use to that of a reflective cape or the like.

The only other prior art which is even remotely pertinent to the present concept is the patent of Warren, 2,372,868. This patent is primarily directed to a new and useful rope or cable adapted for use on highways to mark curves on the road, such rope containing means for reflecting back a portion of the light impinging on the rope or cable from the headlights of an approaching vehicle. As shown in FIG. 1 of this patent, the rope preferably consists of a plurality of strands and at least one of said strands includes a light reflective element or filament 14 and at least one luminous element or filament 15. In FIGS. 6 and 7 of this patent, enlarged views of one of the filaments 14 are shown. It is stated that filaments 14 are designed to reflect back a portion of the light rays impinging on the rope or cable 10 from the headlights of an approaching vehicle. It is stated that these filaments are "faceted" to provide them with a multiplicity of reflecting surfaces or faces. These reflecting faces are provided in a series of depressions 25 in the filament. The totally impractical nature of such a construction is obvious to those skilled in the arts. FIG. 8 of this patent shows a modification of the light reflecting filament consisting of a plastic material having embedded therein pieces or bits 31 of light reflecting material. It is stated that the particles 31 may be of very thin glass mirrored on one or both sides as with a flash coating. It is further stated that this is a very thin glass which is mirrored and which is then crushed to provide the bits or particles 31. These particles 31 are then mixed with the plastic material and the filaments 30 are formed. It is stated that preferably the plastic used is clear or transparent whereby the reflecting particles embedded in the body of the filament will function.

The reflective planar particles of the order of magnitude necessary and implied by Warren if applied throughout his strands will act essentially as diffracting apertures distributing the radiations of light frequency in a substantially isotropic manner thereby not providing the retro-reflecting characteristics of the filament provided in accordance with the present invention. In support of this contention, reference is made to numerous standard textbooks on physical optics such as "Physical Optics" by R. W. Wood, "Light" by Dickburn, "Diffraction of Light, X-rays and Material Particles" by Meyer, for substantiating proof of my claims.

The Warren filament employing plural randomly distributed mirrored glass chips embedded in the filament is, for all practical purposes, inoperative as an efficient reflecting device. If it were applied to a garment and utilized as the complete outer surface of said garment, it would be visable over no greater distance to a motorist having his headlights beamed thereon than an equivalent area of white cloth, and as such, would not be an effective means for detecting the wearer at night by reflection of light from an approaching vehicle.

So far as is known, the Warren invention has never been in commercial use. In addition, it would not be obvious that any of the teachings of this rope patent could be applied to threads.

OBJECTS

It is therefore an object of the present invention to provide a new and improved textile filament which has light reflecting characteristics and which may be woven into a textile fabric.

Another object of the present invention is to provide an improved flexible thread having light reflecting characteristics, which when woven into a cloth and exposed to light beams, will return the light beams to the source thereof over a wide range of incident angles.

Still another object is to provide a flexible textile element or filament having auto-collimating characteristics and that may be woven into a flexible fabric.

Another object is to provide a monofilament that has light reflecting characteristics and that is used in the fabrication of a variety of different textile cloth elements or articles of apparel to be worn by human beings, thereby affording greater safety for the wearer at night by making him more visible to passing motorists.

Still another object is to provide textile cloth having reflex reflecting characteristics, the reflex reflecting medium being formed as an integral part of the cloth.

Still another is to provide a monofilament in which a plurality of small glass beads are imbedded therein, whereby when said filament is woven into a garment, the garment will have light reflecting characteristics.

Other objects and the nature and advantages of the instant invention will be apparent from the following description taken in conjunction with the accompanying drawings, wherein.

The Invention Broadly

Figure 1:
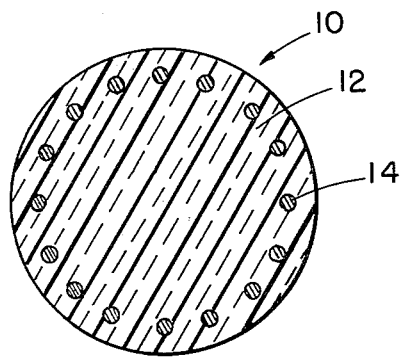
FIG. 1 is a sectional view of a filament showing one form of the invention wherein a plurality of small glass beads are imbedded in the filament.

In its broadest sense, the present invention comprises:
(a) A textile element which transmits light and which has a diameter of between about .004 to .020 inch and
(b) A plurality of reflex reflecting elements incorporated with said textile element.

The Textile Element

The textile element of this invention preferably comprises a monofilament or thread and should be flexible, transmit light and have the desired strength. The diameter of the textile element may range from .004 to .020 inch, depending upon the cloth into which it is to be woven. The preferred diameter is approximately .005 inch. Large diameter textile elements might be used for jackets and sweaters.

The textile element 12 may be made from a number of materials. Polyvinyl chloride is preferred, but other materials such as polyvinylidene chloride, rubber hydrochloride, polyamide resins (e.g. nylon), polyvinyl acetate, cellulose acetate butyrate, etc. may also be used, the choice depending upon tensile strength, wear resistance, flexibility, etc.

Plastic monofilaments of the above mentioned kind are made by a number of manufacturers, such as du Pont, Dow, Acco Polymers, American Cyanamid, Celanese, etc.

The Reflex Reflecting Elements

The reflex reflecting elements of this invention are preferably small spheres or beads 14 having a diameter of between about one mil and 50 mils, depending primarily upon the diameter of the thread. These spheres or beads must be made of glass, but ordinary glass would not be suitable. The glass must have a refractive index in the range of 1.5 to 2.0 and it is preferably between 1.8 and 2.0. Spheres made of glass having a low refractive index are not retro-reflective per se. Glass with a refractive index closer to 1.5 or lower will not offer good retroreflection. The Cataphot Corporation of Toledo, Ohio manufactures reflex reflecting beads having a refractive index in excess of 1.85 and within the aforesaid preferred diameter range.

Alternatively, the reflex reflecting elements of this invention may comprise glass cylinders of between about 2 and 10 mils in diameter, depending of course upon the diameter of the textile filament. The length of the cylinders may be very short (10–100 mils) or they may run the length of the filament, since they are embedded or integrally secured therein. The index of refraction of such cylinders should be between 1.5 and 2.0 and preferably between 1.8 and 2.0.

The reflex reflective elements may be dispersed at random throughout the textile element, particularly if dispersed in sufficiently dense concentrations, but more preferably are arranged in a circular or helical pattern or array about the longitudinal axis of the thread or filament 12.

Integrating the Reflex Reflecting Elements With the Textile Element

The reflex reflecting elements may be dispersed or integrated with the textile element in a number of ways.

One way of joining these two elements is to form an extrusion mixture comprising one of the aforesaid plastic materials and a quantity of the aforesaid reflex reflecting elements (e.g. beads or spheres). Such a mixture, in a molten or flowing condition, could then be extruded through an appropriate sized die or spinneret, as will be obvious to those skilled in this art.

Figure 3:
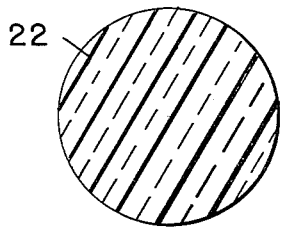
FIGURES 3–7 are sequential sectional views of filaments showing various methods whereby beads can be incorporated into the filament.
Figure 4:
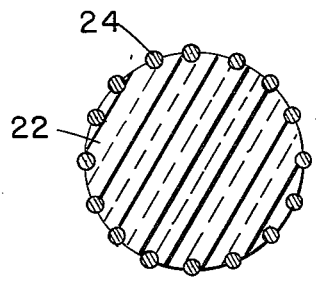
Figure 5:
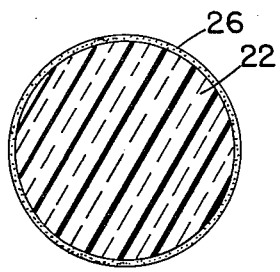
Figure 6:
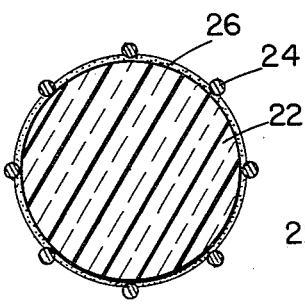
Figure 7:
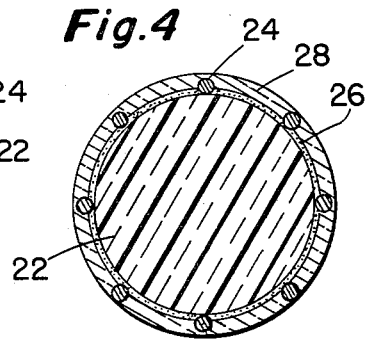

Alternatively, (see FIGURES 3 and 4) one could first extrude a filament 22 consisting solely of plastic material, whereafter beads or spheres 24 could be caused to adhere thereto. Such adherence would occur if the beads were brought into contact with the filament surface while it still was in a slightly adhesive or molten condition. Such adherence could also be brought about by first forming a filament 22 as shown in FIGURE 3, then coating the exterior of the filament 22 with a suitable adhesive 26 (see FIGURE 5), thereafter attaching the beads or spheres 24 (see FIGURE 6), and finally applying a transparent coating 28 over the beads (such as polyvinyl chloride, rubber hydrochloride, methyl methacrylate, etc.). Such a transparent coating serves to protect the beads from external forces applied to the thread and from wear.

It is further seen that a plurality of the flexible textile elements 10 may be woven into a fabric for use as a garment such as a coat, sweater, jacket, sock or the like, and since the monofilament 12 has the reflex reflecting spheres 14 embedded therein, the garment so formed will be particularly useful for pedestrian safety at nighttime. The garment formed with the light reflecting monofilaments is woven in any conventional manner and may include any number of the light reflecting monofilaments depeding upon the requirements desired. For example, the entire body may be formed of the light reflecting monofilaments, or may be formed in such a manner that the light reflecting monofilaments are evenly spaced between conventional fibers. The light reflecting monofilaments may be woven into any part of a garment and may be utilized to form various configurations or signals that will be visible on the garment when it is worn at night and automobile headlamps are beamed thereon.

Figure 2:
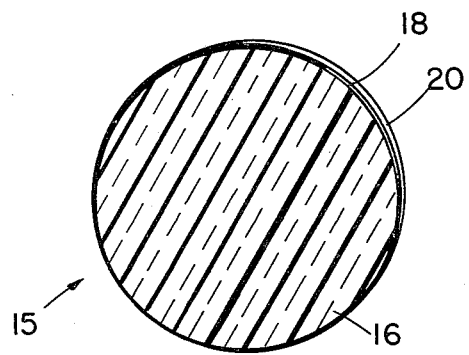
FIG. 2 is a sectional view of a filament showing another inventive embodiment wherein the filament is formed of light-transmitting, synthetic material.

Referring now to FIG. 2, a different embodiment of a reflective thread is illustrated and it includes a textile element generally indicated at 15. The element 15 comprises an elongated monofilament 16 made of a flexible transparent or light transmitting plastic of any known synthetic plastic material. The monofilament 16 is essentially cylindrical in configuration and, as such, acts as a cylindrical lens when light beams are projected thereon. A portion of the surface of the monofilament 16 has a coating 18 applied thereto comprising a highly reflective material, for instance, a metal such as vacuum deposited aluminum, and the monofilament 15 as thus constituted, defines a cylindrical type of reflector which has auto collimating characteristics over a limited range of incident angles. The reflective coating 18 extends around less than 180 degrees of the exterior surface of the monofilament 16 so that the metallized coating will not cover the part of the surface which faces the incident light. A layer or coating of a transparent plastic 20 (such as polyvinyl chloride) is applied to the outer surface of the metallized layer 18 and may be of the same material as the plastic material that defines the monofilament, the outer layer 20 thereby protecting the thin metallic layer 18 which is normally not more than a few millionths of an inch thick and which is applied by one of the conventional vacuum metallizing techniques (22).

It is seen that the monofilaments encompassed by the present application may either be formed with limited reflectivity such as in FIG. 2, or have wide range of reflectivity as shown in FIG. 1. In either case, light beams striking the reflector elements embedded in the monofilaments return to their source. Thus, when the monofilaments are woven into a garment and are worn at night, motor vehicle light beams striking the reflecting elements embedded in the filaments will be directed back toward the source and thereby render the garment and wearer easily discernible. It is apparent that the monofilaments may be woven into a variety of types of garments.

It will be obvious to those skilled in the art that various changes may be made without departing from the spirit of the invention and therefore the invention is not limited to what is shown in the drawings and described in the specification but only as indicated in the appended claims.

Related Cases

This application is a continuation-in-part of my copending application, Serial No. 658,581, filed May 13, 1957, now abandoned, which in turn was a division of my application, Serial No. 360,954, filed June 11, 1953.

What is claimed is:

1. In wearing apparel for use primarily at nighttime said apparel being made of a plurality of filaments woven together to define a garment, at least some of said filaments being formed of a flexible light transmitting material having a diameter of about .004 to .02 inch and a plurality of small glass spheres embedded therein, said small glass spheres having a diameter of 1 to 50 mils, a refractive index of 1.5 to 2.0 and having retro-reflecting characteristics capable of reflecting light directed thereto back to the source thereof, whereby said garment is rendered clearly visible at nighttime when light is directed thereagainst and thereby defines a safety device when worn as an outer garment by the user.

2. A reflecting textile element for use in a garment comprising in combination a light transmitting flexible elongated thread member having a diameter of about .004 to .02 inch, a plurality of minute glass spheres embedded in the body of said thread member in a layer along the length thereof, said spheres having a diameter of between about 1 and 50 mils, a refractive index of between about 1.5 and 2.0, having retro-reflecting characteristics and being free of sharp and abrasive edges so as to enable the garment to be worn next to the skin of the wearer without irritation thereof, said spheres being provided in sufficient density whereby when said spheres are exposed to light the retro-reflecting characteristics of said spheres cause light striking said textile element to be reflected back to its source over a wide range of incident angles thereto thus making said garment clearly viewable during nighttime use.

3. In a reflecting textile material adapted to be woven into an outer garment for use as a safety reflecting device at night time, comprising the combination of a flexible light transmitting thread member having a diameter of about .004 to .02 inch, a plurality of minute glass spheres extending the length of said thread member and embedded therein, each of said spheres having reflex reflecting characteristics, diameters within the range of 1 to 50 mils, a refractive index within the range of 1.5 to 2.0 and defining a reflex reflector for reflecting light directed thereto over a wide range of incident angles back to the source thereof, said spheres being disposed in said thread member in sufficient density and in a circumscribing array whereby light striking said thread member from any angle will be reflected back to the source thereof, thereby enabling said garment which contains said thread member as part of the exterior surface thereof to be easily viewable by the driver of an approaching vehicle from which said light emanates.

4. In a reflecting textile element as set forth in claim 3, wherein said glass elements are smoothly contoured and are entirely free of abrasive characteristics which would ordinarily irritate the skin of the wearer of said garment.

5. In a reflecting textile material as set forth in claim 4 wherein said spheres are coated with an outer layer of transparent plastic material, said plastic material firmly embedding said spheres in said thread member in said circumscribing array and having an index of refraction other than that of said spheres.

References Cited in the file of this patent
UNITED STATES PATENTS

| | | |
|---|---|---|
| 2,034,008 | Taylor | Mar. 17, 1936 |
| 2,372,868 | Warren | Apr. 3, 1945 |
| 2,592,882 | Fisher et al. | Apr. 15, 1952 |
| 2,937,668 | Carey et al. | May 24, 1960 |